L. C. DICKINSON.
CROSS HEAD.
APPLICATION FILED MAY 24, 1915.
1,176,662.
Patented Mar. 21, 1916.
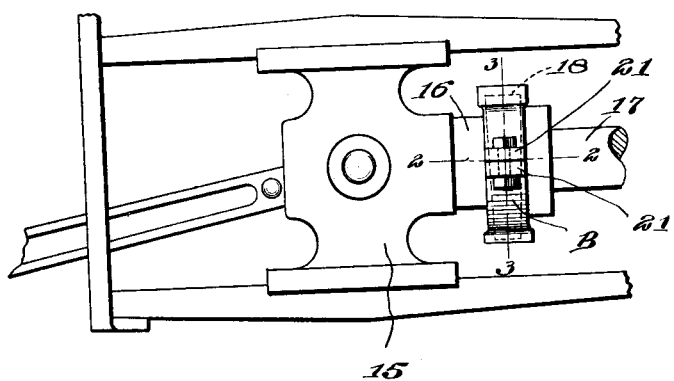
Fig. 1.
Fig. 2.
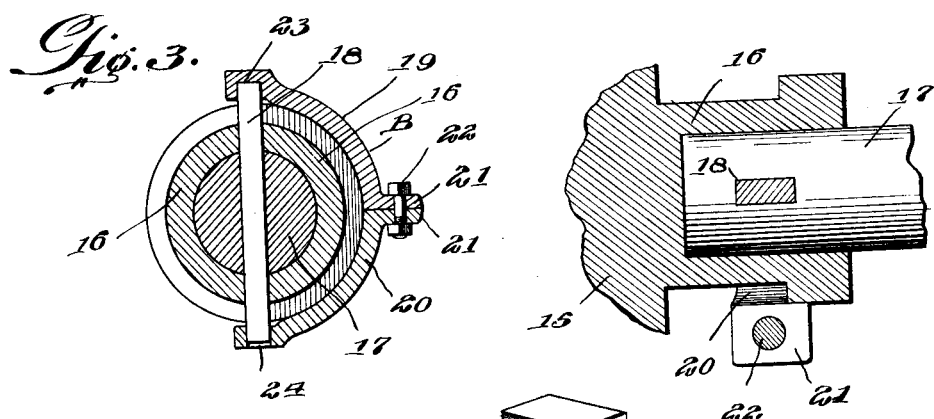
Fig. 3.
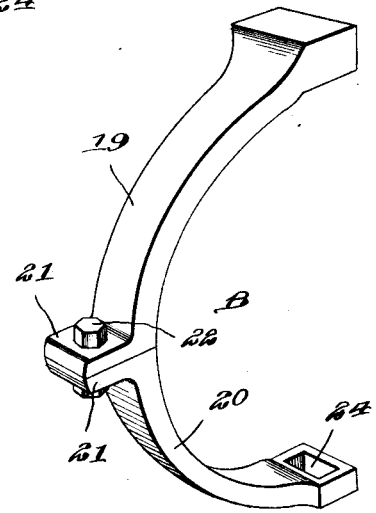
Fig. 4.
Inventor
Louis Cecil Dickinson
By Victor J. Evans.
Attorney
Witnesses
Frederick L. Fox.
Wm Bagger

UNITED STATES PATENT OFFICE.

LOUIS C. DICKINSON, OF CANTON, MISSISSIPPI.

CROSS-HEAD.

1,176,662.  Specification of Letters Patent.  Patented Mar. 21, 1916.

Application filed May 24, 1915. Serial No. 30,189.

*To all whom it may concern:*

Be it known that I, LOUIS CECIL DICKINSON, a citizen of the United States, residing at Canton, in the county of Madison and State of Mississippi, have invented new and useful Improvements in Cross-Heads, of which the following is a specification.

This invention relates to cross heads for locomotives and the like, and it has for its object to produce a simple, improved and effective connection between the cross head and the piston rod.

A further object of the invention is to provide simple and effective means for locking in position the key which connects the piston rod with the cross head.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation, showing a portion of a piston rod and a cross head to which the invention has been applied. Fig. 2 is an enlarged sectional detail view taken on the line 2—2 in Fig. 1. Fig. 3 is an enlarged transverse sectional view taken on the line 3—3 in Fig. 1. Fig. 4 is an enlarged perspective view showing the locking device detached.

Corresponding parts in the several figures are denoted by like characters of reference.

The cross head 15 is provided with the usual socket 16 for the reception of the piston rod 17 which is secured in the socket by means of a wedge key 18 for the passage of which the piston rod and the walls of the socket are suitably apertured. For the purpose of securing the key against possibility of accidental dislodgment I provide a locking device consisting of an approximately semi-circular yoke B composed of two arcuate members 19, 20, each having at one end a lug 21, and said lugs being apertured for the passage of a connecting member, such as a bolt 22. The member 19 is provided with a recess 23 in the inner face thereof, while the member 20 is provided with a slot 24. The recess 23 and the slot 24 are formed in the ends of the arcuate members 19, 20 which are distant from the lugs 21, and said recess and slot are placed in registry with each other. The recess 23 is adapted to constitute a seat for the large end of the wedge key 18, the small end of which may project through the slot 24.

In the practical use of this invention, the locking device B is placed astride the socket member 16 of the cross head, the large end of the keeper 18 being seated in the recess 23, while the small end of the key engages the slot 24. In applying the locking device, the members 19, 20 may be disassembled by loosening the bolt 22 which afterward may be retightened to secure the parts in assembled relation. When thus applied, the yoke B will obviously prevent any possibility of the key 18 becoming disconnected, thereby insuring the safety of the connection between the piston rod and the cross head.

Having thus described the invention, what is claimed as new, is:—

1. The combination with a cross head having a socket, a piston rod engaging the socket, and a wedge key extending transversely through the socket and the piston rod, of a locking device comprising two arcuate members, one having a key seat and the other having a slot, said key-seat and slot engaging the two ends of the wedge key, and means whereby said members are detachably secured together.

2. The combination with a cross head having a socket, a piston rod engaging said socket, and a key extending transversely through the socket and the piston rod, of a locking device consisting of a yoke comprising two arcuate members each having at one end a lug, the other ends of the members being provided, respectively, with a key seat and a slot disposed in registry with each other in engagement with the two ends of the key extending transversely through the socket and the piston rod, and a bolt extending through the lugs of the members to connect the same.

In testimony whereof I affix my signature in presence of two witnesses.

LOUIS C. DICKINSON.

Witnesses:
N. C. PERRY,
H. C. BENNETT.

Copies of this patent may be obtained for five cents each, by addressing the "Commissioner of Patents, Washington, D. C."